United States Patent
Xie et al.

(10) Patent No.: US 9,916,776 B2
(45) Date of Patent: Mar. 13, 2018

(54) POLYESTER-MELAMINE COATINGS AND LABELS INCLUDING THE SAME

(71) Applicant: Avery Dennison Corporation, Glendale, CA (US)

(72) Inventors: Shuhui Xie, Kunshan (CN); Yisong Huo, Kunshan (CN); ZhiJian Xue, Shanghai (CN)

(73) Assignee: Avery Dennison Corporation, Glendale, CA (US)

( * ) Notice: Subject to any disclaimer, the term of this patent is extended or adjusted under 35 U.S.C. 154(b) by 11 days.

(21) Appl. No.: 14/565,472

(22) Filed: Dec. 10, 2014

(65) Prior Publication Data

US 2015/0179089 A1    Jun. 25, 2015

Related U.S. Application Data

(63) Continuation of application No. PCT/CN2013/090083, filed on Dec. 20, 2013.

(Continued)

(51) Int. Cl.
*G09F 3/02* (2006.01)
*G09F 3/00* (2006.01)
(Continued)

(52) U.S. Cl.
CPC ............. *G09F 3/02* (2013.01); *G06K 19/02* (2013.01); *G06K 19/0776* (2013.01); *G09F 3/0297* (2013.01); *G09F 3/10* (2013.01); *G09F 2003/026* (2013.01); *G09F 2003/0208* (2013.01); *G09F 2003/0241* (2013.01); *Y10T 428/24802* (2015.01); *Y10T 428/25* (2015.01); *Y10T 428/263* (2015.01);
(Continued)

(58) Field of Classification Search
CPC ................ G06K 19/02; G06K 19/0776; Y10T 428/24802; Y10T 428/25; Y10T 428/263; Y10T 428/264; Y10T 428/265; Y10T 428/266; Y10T 428/2839; Y10T 428/2848; Y10T 428/31721; Y10T 428/31797
See application file for complete search history.

(56) References Cited

U.S. PATENT DOCUMENTS

RE24,906 E    12/1960 Ulrich
2,973,286 A    2/1961 Ulrich
(Continued)

FOREIGN PATENT DOCUMENTS

CN    102131640    2/2015
EP    0288964    10/1992
(Continued)

OTHER PUBLICATIONS

Cymel 303 MSDS pdf, copyright 2000.*
(Continued)

*Primary Examiner* — Laura C Powers
(74) *Attorney, Agent, or Firm* — Avery Dennison Corporation (57) ABSTRACT

Polyester-melamine coatings that exhibit desirable heat resistance and adhesion to a variety of polyolefin materials and labels including such coatings are provided. The polyester-melamine compounds present within the coatings can be obtained by reacting an etherified melamine and a hydroxylated polyester.

36 Claims, 3 Drawing Sheets

Related U.S. Application Data (60) Provisional application No. 61/919,632, filed on Dec. 20, 2013.

(51) Int. Cl.
*G09F 3/10* (2006.01)
*G06K 19/077* (2006.01)
*G06K 19/02* (2006.01)

(52) U.S. Cl.
CPC ........ *Y10T 428/264* (2015.01); *Y10T 428/265* (2015.01); *Y10T 428/266* (2015.01); *Y10T 428/2839* (2015.01); *Y10T 428/2848* (2015.01); *Y10T 428/31721* (2015.04); *Y10T 428/31797* (2015.04)

(56) References Cited

U.S. PATENT DOCUMENTS

| | | | | |
|---|---|---|---|---|
| 4,525,535 A | * | 6/1985 | Craun | C09D 125/14 524/501 |
| 4,734,467 A | | 3/1988 | Yamada et al. | |
| 5,712,081 A | * | 1/1998 | Andriessen | G03C 1/035 430/399 |
| 5,880,187 A | * | 3/1999 | Kawazu | C09D 125/14 524/506 |
| 2004/0058133 A1 | * | 3/2004 | Bilodeau | B32B 27/08 428/195.1 |
| 2009/0029159 A1 | | 1/2009 | Guo | |
| 2010/0218886 A1 | * | 9/2010 | Weinert | C08G 18/10 156/212 |
| 2012/0164442 A1 | * | 6/2012 | Ong | B32B 27/08 428/336 |

FOREIGN PATENT DOCUMENTS

| | | |
|---|---|---|
| EP | 0803555 | 10/1997 |
| EP | 1340779 | 11/2006 |
| JP | 2005/015516 | 1/2005 |
| WO | 2011/029225 | 3/2011 |

OTHER PUBLICATIONS

International Search Report and Written Opinion issued in corresponding International Application No. PCT/CN2013/090083 filed Dec. 20, 2013.

International Preliminary Report on Patentability issued in corresponding International Application No. PCT/CN2013/090083 filed Jun. 21, 2016.

* cited by examiner

POLYESTER-MELAMINE COATINGS AND LABELS INCLUDING THE SAME

CROSS-REFERENCE TO RELATED APPLICATION

The present application claims the benefit of U.S. Provisional Application No. 61/919,632 filed Dec. 20, 2013, and International Application No. PCT/CN2013/090083 filed Dec. 20, 2013, both of which are incorporated herein by reference in their entireties.

TECHNICAL FIELD

The presently disclosed invention relates generally to polyester-melamine coatings that exhibit heat resistance and adhesion to a variety of polyolefin materials. The presently disclosed invention also relates to labels including such polyester-melamine coatings.

BACKGROUND

Electronic equipment manufacturers benefit from automated assembly, processing, test and packaging systems which include automatic identification. For instance, labels including barcodes printed thereon are typically adhered to a printed circuit board (PCB) before soldering to provide for automatic identification. These labels must withstand harsh thermal and chemical exposures and still meet optical requirements for reliable scanning.

The present invention includes improved coatings for a labels (e.g, PCB labels) that withstand elevated temperatures, exhibit resistance to many common solvents, and are receptive to printing (e.g., thermal transfer printing).

BRIEF SUMMARY

One or more embodiments of the present invention may address one or more of the aforementioned problems. Certain embodiments according to the present invention provide polyester-melamine coatings that exhibit desirable heat resistance and adhesion to a variety of polyolefin materials. Polyester-melamine coatings according to certain embodiments of the present invention may also support or are receptive to a variety of printing techniques including thermal transfer printing. Accordingly, the polyester-melamine coatings can beneficially be incorporated onto a variety of labels as an overvarnish or topcoat layer. The present invention, therefore, also provides labels, such as printed circuit board labels and other labels, that may receive printed indicia and that may have heat resistance, chemical resistance and/or scratch resistance.

In accordance with certain embodiments, the present invention provides labels including a facestock comprising a polyolefin film. The polyolefin film includes a top surface and a bottom surface. A topcoat layer comprising a polyester-melamine coating containing one or more polyester-melamine compounds can be positioned at least one of proximate or directly adjacent to at least a portion of the top surface of the polyolefin film. In certain embodiments, the topcoat layer is directly adjacent the top surface of the polyolefin film. An adhesive layer can be positioned at least one of proximate or adjacent to at least a portion of the bottom surface of the polyolefin film. In certain embodiments, a releasable liner can be positioned adjacent the adhesive layer such that the adhesive layer is sandwiched directly or indirectly between the bottom surface of the polyolefin film and the releasable liner.

In another aspect, the present invention provides a form comprising a plurality of labels in which at least one of said labels includes a topcoat layer including one or more polyester-melamine compounds. The labels can be releasably attached or adhered to a carrier sheet. In this regard, the form including the labels can be processed through an appropriate printer for imparted the desired indicia onto a plurality of the labels at a single time.

In yet another aspect, the present invention provides a continuous roll of labels. The continuous roll of labels can comprise a plurality of labels in which at least one of said labels includes a topcoat layer including one or more polyester-melamine compounds. The labels can be releasably attached or adhered to a carrier layer (e.g., releasable liner, film, etc.).

BRIEF DESCRIPTION OF THE DRAWING(S)

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

DETAILED DESCRIPTION

The present invention now will be described more fully hereinafter with reference to the accompanying drawings, in which some, but not all embodiments of the inventions are shown. Indeed, this invention can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one embodiment, the present invention includes polyester-melamine coatings that exhibit desirable heat resistance and adhesion to a variety of polyolefin materials. Polyester-melamine coatings according to certain embodiments of the present invention can also support or are receptive to a variety of printing techniques, including thermal transfer printing. Accordingly, the polyester-melamine coatings can beneficially be incorporated onto a variety of labels as an overvarnish or topcoat layer. The present invention, therefore, also provides labels, such as printed circuit board labels and the like, that can receive printed indicia, such as barcodes and the like, and have high heat resistance (e.g., withstand high temperature), chemical resistance (e.g., harsh fluxes, cleaners, saponifier, and wave solder, etc.), and/or scratch resistance.

The term "label" as used herein can comprise an article for attachment to an object, identification of an object, and/or tracking of an object. In accordance with certain embodiments of the present invention, the term "label" may comprise multiple layers, such as 2, 3, 4, 5, 6, or more.

The term "proximate" in the context of the relative positioning of two particular layers of a label includes the positioning of a layer being one or more layers removed from another layer. That is, the term "proximate" in the context of the relative positioning of a first layer and a second layer can mean that the first and second layers are separated by 1, 2, 3, or more intermediate layers (e.g., layers positioned between the first and second layers).

In accordance with certain embodiments, the present invention provides labels, such as printable heat resistant labels, including a facestock comprising a polyolefin film. The polyolefin film, which may provide strength and substance to the label, includes a top surface and a bottom surface. A topcoat layer comprising a polyester-melamine coating containing one or more polyester-melamine compounds can be positioned proximate to and/or directly adjacent to at least a portion of the top surface of the polyolefin film. In certain embodiments, the topcoat layer is directly adjacent the top surface of the polyolefin film. The topcoat layer may be adapted to support and/or receive printed indicia, such as an ink-image, serial number, barcode, or the like, from a printer or other image-delivering device.

An adhesive layer may be positioned at least proximate and/or directly adjacent to at least a portion of the bottom surface of the polyolefin film and may provide a means to attach the label to a variety of objects. The adhesive layer may include an adhesive and, in some embodiments, the adhesive layer may comprise a pressure sensitive adhesive. In certain embodiments, a releasable liner may be positioned adjacent the adhesive layer such that the adhesive layer is disposed, or sandwiched, directly or indirectly between the bottom surface of the polyolefin film and the releasable liner. The releasable liner may function as a protective cover/release liner that remains in place until the label is ready for attachment to an object. Moreover, labels according to certain embodiments of the present invention may comprise other layers either above the topcoat layer, between the topcoat layer and the polyolefin film, and/or between the polyolefin film and the adhesive layer.

Figure 1:
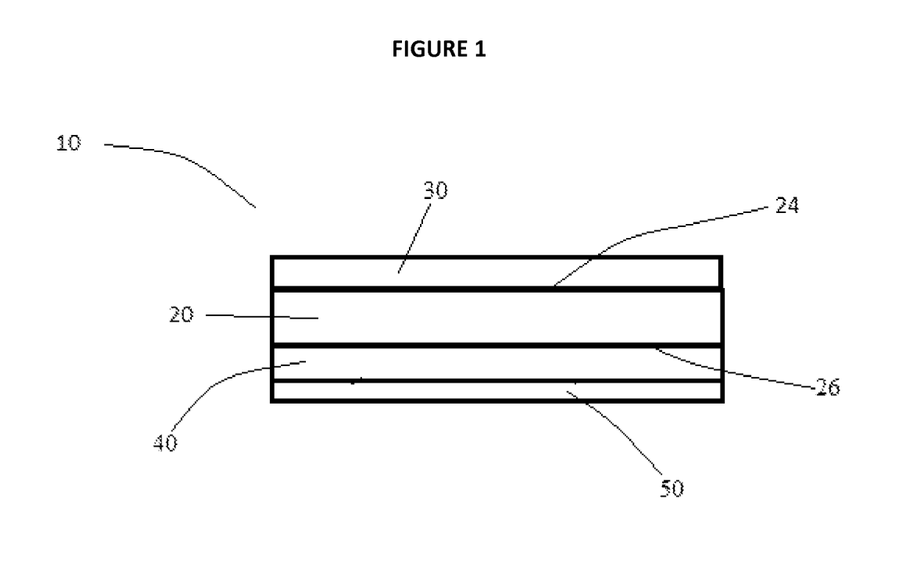
FIG. 1 illustrates a cross-sectional view of a particular label according to certain embodiments of the present invention.

FIG. 1 illustrates a cross-sectional view of a particular label 10 according to certain embodiments of the present invention. The particular embodiment shown in FIG. 1 includes a facestock comprising a polyolefin film 20. The polyolefin film includes a top surface 24 and a bottom surface 26. Label 10 also includes a topcoat layer 30 comprising one or more polyester-melamine compounds. In the embodiment shown in FIG. 1, the topcoat layer 30 is directly adjacent the top surface 24 of the polyolefin film 20. An adhesive layer 40 is positioned directly adjacent the bottom surface 26 of the polyolefin film 20. This particularly illustrated embodiment also includes a releasable liner 50 positioned directly adjacent the adhesive layer 40 such that said adhesive layer 40 is sandwiched directly between the bottom surface 26 of the polyolefin film 20 and said releasable liner 50.

As noted previously, labels according to certain embodiments of the present invention may comprise a topcoat layer. Such topcoat layers may comprise a polyester-melamine coating containing one or more polyester-melamine compounds. In accordance with certain embodiments of the present invention, the one or more polyester-melamine compounds may comprise the product from a reaction of an etherified melamine and a hydroxylated polyester.

Although any etherified melamine may be suitable for certain embodiments, in some embodiments, the etherified melamine may, by way of example, comprise melamine compounds substituted with a hydroxymethyl and/or alkoxymethyl group(s). Such compounds are commercially available from a variety of sources with a variety of substituted hydroxymethyl and/or alkoxymethyl groups. For instance, examples of suitable etherified melamine compounds include CYMEL 300, CYMEL 303, CYMEL 325 and CYMEL 725 (all commercially available from Nihon Cytec Industries Inc.), NIKALAC MW-30M, NIKALAC MW-30, NIKALAC MW-30HM, NIKALAC MW-390, and NIKALAC MW-100LM (all commercially available from Sanwa Chemical Co., Ltd.). Each of the foregoing products comprises a methoxymethylated melamine compound. By way of example, additional etherified melamine compounds suitable for certain embodiments of the present invention include methylated methoxymethylated melamine compounds, such as CYMEL 370 and CYMEL 701 (both commercially available from Nihon Cytec Industries Inc.); methoxymethylated butoxymethylated melamine compounds, such as CYMEL 266, CYMEL 285 and CYMEL 212 (all commercially available from Nihon Cytec Industries Inc.); and methylated methoxymethylated melamine compounds, such as CYMEL 272 and CYMEL 202 (all commercially available from Nihon Cytec Industries Inc.). In additions, methoxymethylated isobutoxymethylated melamine compounds such as CYMEL 238, available from Nihon Cytec Industries Inc., and butoxymethylated melamine compounds, such as MY COAT 506 available from Nihon Cytec Industries Inc., may be utilized according to certain embodiments of the present invention.

Hydroxylated polyesters as used herein may comprise hydroxyl group-terminated linear or branched polyesters. Any suitable hydroxylated polyester may be used according to certain embodiments of the present invention. For example, suitable hydroxylated polyesters may include polymerized copolyester resins such as VYLON 103, VYLON 200, VYLON 220, VYLON 240, VYLON 270, VYLON 300, VYLON 500, VYLON 226, VYLON 670, and VYLON 550 (all commercially available from Toyobo). Additional exemplary hydroxylated polyesters comprise a range of high-molecular weight and medium-molecular weight copolyesters (e.g., molecular weight ranging from about 2,000 grams per mole to about 20,000 grams per mole), such as DYNAPOL L912, DYNAPOL L952, DYNAPOL L206, DYNAPOL L205, DYNAPOL L208, DYNAPOL L210, DYNAPOL L411, DYNAPOL L850, DYNAPOL L658, DYNAPOL LH815, DYNAPOL LH830, DYNAPOL LH828, and DYNAPOL LH744 (all commercially available from Evonik Degussa).

As indicated, any suitable etherified melamine compounds may be used in the present invention. For example, in some embodiments, the etherified melamine may comprise a plurality of alkoxy groups (e.g., R1-O—R2) to increase the number of reaction sites on a given molecule of an etherified melamine. In accordance with certain embodiments, the etherified melamine comprises a plurality of alkoxy groups and each of the plurality of alkoxy groups are the same. Alternatively, at least one alkoxy group can be different than at least one other alkoxy group.

By way of example, in some embodiments, the etherified melamine comprises an etherified melamine formaldehyde. In some embodiments, the etherified melamine may comprise hexa(methoxymethyl)melamine (HMMM). For example, Reaction Scheme 1 (provided below) illustrates the reaction of an etherified melamine with a hydroxylated polyester to form polyester-melamine compounds according to certain embodiments of the present invention.

The topcoat may comprise a polyester-melamine coating containing one or more polyester-melamine compounds according to the following formula:

Formula I wherein Q1, Q2, Q3, Q4, Q5, and Q6 are each independently selected from a polyester, a hydrogen atom, an alkyl group including from 1 to 8 carbon atoms (e.g., 1, 2, 3, 4, 5, 6, 7, or 8 carbon atoms), or an aryl group including from 6 to 10 carbon atoms (e.g., 6, 7, 8, 9, of 10 carbon atoms); and R1, R2, R3, R4, R5, and R6 are each independently selected from a hydrogen atom, an alkyl group including from 1 to 8 carbon atoms (e.g., 1, 2, 3, 4, 5, 6, 7, or 8 carbon atoms), or an aryl group including from 6 to 10 carbon atoms (e.g., 6, 7, 8, 9, of 10 carbon atoms). In some embodiments, Q1, Q2, Q3, Q4, Q5, and Q6 each comprise a polyester.

In accordance with certain embodiments, at least 2 or more of R1, R2, R3, R4, R5, and R6 are the same. In certain such embodiments, R1, R2, R3, R4, R5, and R6 can all comprise the same chemical species. Alternatively, R1, R2, R3, R4, R5, and R6 can each be different chemical species.

In accordance with certain embodiments of the present invention, at least 2 or more of Q1, Q2, Q3, Q4, Q5, and Q6 are the same. In such embodiments, Q1, Q2, Q3, Q4, Q5, and Q6 can comprise the same chemical species. Alternatively, Q1, Q2, Q3, Q4, Q5, and Q6 can each be different chemical species.

The topcoat layer may optionally include one or more fillers and/or additives. Such fillers and/or additives, for example, may be incorporated into the topcoat layer in conventional quantities using conventional equipment and techniques. For example, representative fillers can include talc, calcium carbonate, organo-clay, glass fibers, marble dust, cement dust, feldspar, silica or glass, fumed silica, silicates, alumina, various phosphorus compounds, ammonium bromide, titanium dioxide, antimony trioxide, antimony trioxide, zinc oxide, zinc borate, barium sulfate, silicones, aluminum silicate, calcium silicate, glass microspheres, chalk, mica, clays, wollastonite, ammonium octamolybdate, intumescent compounds and mixtures of two or more of these materials. The fillers may also carry or contain various surface coatings or treatments, such as silanes, fatty acids, and the like. Still other fillers can include flame retardants, such as the halogenated organic compounds. In certain embodiments, the topcoat layer may include one or more thermoplastic elastomers that are compatible with the other constituents of the topcoat layer, such as etherified melamine, hydroxylated polyester, polyester-melamine, and other suitable elastomers.

The topcoat layer can also include pigment dispersants, such as Nuosperse® 657 available from Elementis Specialties. In accordance with certain embodiments, the topcoat layer may also include carbon pigments, such as carbon black, ivory black, or the like, and/or one or more of a variety of other pigments, such as copper pigments (e.g., phthalocyanine dyes such as phthalocyanine blue), cadmium pigments (e.g. cadmium yellow), chromium pigments (e.g., chrome yellow), cobalt pigments (e.g., cobalt blue), iron oxide pigments (e.g., oxide red), and any other suitable pigments. Any colorants, pigments, and pigment dispersant are suitable to the extent that they do not interfere with desired loadings and/or physical or mechanical properties of the topcoat layer.

In accordance with certain embodiments, the topcoat layer can also include one or more flow and/or leveling agent to mitigate the occurrence of any surface defects (e.g., formation of pinholes, cratering, peeling, scarring, blistering, air bubbles, etc.). Suitable flow and/or leveling agents utilized are those that do not interfere with desired loadings and/or physical or mechanical properties of the topcoat layer. In certain embodiments, for instance, several commercially available flow and/or leveling agents may be utilized, including, for example BYK-392 (solution of a polyacrylate) from BYK Additives & Instruments; BYK-310 (solution of a polyester modified polydimethylsiloxane) from BYK Additives & Instruments; EFKA 3277 (fluorocarbon modified polyacrylate) from BASF; and/or EFKA 3740 (polyacrylate) from BASF.

The topcoat layer may also include one or more defoaming agents. A defoaming agent generally reduces or mitigates the formation of foaming in the topcoat layer when deposited or generally handled or transferred from one location to another. Generally, any defoaming agent that does not interfere in some embodiments, desired loadings and/or physical or mechanical properties of the topcoat layer may be used. For instance, the defoaming agent may be mineral-based, silicone-based, or non-silicone-based.

In accordance with certain embodiments, the topcoat layer may also include one or more antioxidants. Any suitable antioxidants for a particular embodiment may be used. In some embodiments, antioxidants may be selected that exhibit good heat resistance and mitigate the discoloration of polymeric-based articles/coatings. Exemplary antioxidants suitable for use according to certain embodiments of the present invention include, but not limited to, CHINOX 626, CHINOX 625 (organophophite antioxidant), CHINOX 245 (steric hindered phenolic antioxidant), and CHINOX 30N (blend of hindered phenolic antioxidants), each of which is commercially available from Double Bond Chemical Ind., Co., Ltd.

The topcoat layer may also include one or more matting agents which may facilitate formation of a smooth topcoat layer. Any suitable matting agent for a particular embodiment may be utilized. In some embodiments, the matting agents may have a small particle size. For example, in some embodiments, the matting agents may have a particle size of less than 10 microns on average or less than 5 microns on average, such as modified or surface treated silica. The silica may be treated a variety of organic polymers depending on the particular resin system employed in the topcoat layer. In certain embodiments, the matting agent may include untreated silicon dioxide.

According to certain embodiments of the present invention, suitable catalyst may also be used. For instance, the constituents of the topcoat may include one or more acid catalysts, such as para-toluene sulfonic acid (PTSA) or methyl sulfonic acid (MSA). Useful acid catalysts may include, by way of example, boric acid, phosphoric acid, sulfate acid, hypochlorides, oxalic acid and ammonium salts thereof, sodium or barium ethyl sulfates, sulfonic acids, and similar acid catalysts. Other useful catalysts, according to certain embodiments, may include dodecyl benzene sulfonic acid (DDBSA), amine blocked alkane sulfonic acid (MCAT 12195), amine blocked dodecyl para-toluene sulfonic acid (BYK 460), and amine blocked dodecyl benezene sulfonic acid (Nacure 5543).

In accordance with certain embodiments of the present invention, the topcoat layer may comprise a variety of different thicknesses. For instance, the topcoat layer may comprise a thickness of from about 0.1, 0.2, 0.3, 0.4, or 0.5 mils to about 5, 5, 4, 3, 2, or 1 mils, including each sub-range therein. For example in some embodiments, the top coat layer may have a thickness in the range of 0.1 to 4 mils, 0.2 to 2 mils, or 0.4 to 1 mils.

The topcoat layer, in accordance with certain embodiments of the present invention, may be applied onto the facestock by any known techniques in the art, such as spray, roll, brush, or other techniques. In some embodiments, the topcoat layer may be coated onto the facestock as a solvent-based system. The amount of carriers and/or solvent's) in the topcoat composition may vary depending on the desired coating viscosity. In accordance with certain embodiments, the solvent(s) may comprise any conventional solvent for polyesters and melamine resin systems. For example, such solvents may include ketones of from 3 to 15 carbon atoms (e.g., methyl ethyl ketone or methyl isobutyl ketone), alkylene glycols and/or alkylene glycol alkyl ethers having from 3 to 20 carbon atoms, acetates and their derivatives, ethylene carbonate, and other suitable solvents. Suitable alcohol solvents include $C_1$ to $C_8$ mono-alcohols, such as methyl, ethyl, propyl, butyl alcohols, as well as cyclic alcohols such as cyclohexanol. In certain embodiments, most acetate-type solvents may be used, such as n-butyl acetate, n-propyl acetate, and other acetate-type solvents. In accordance with certain embodiments, a portion of the solvent system may include water is so desired. In other embodiments, however, the solvent system may be devoid of water.

As noted above, labels according to embodiments of the present invention may comprise at least one polyolefin film. In some embodiments, the polyolefin film may comprise any polyolefin material that exhibits good mechanical strength and heat resistance. Exemplary polyolefin films may comprise at least one of a polyimide, a polyester, a polyetherimide (PEI), a polyethylene naphthalate (PEN), a polyether sulfone (PES), a polysulfone, polymethylpentene (PMP), a polyvinylidene fluoride (PVDF), a ethylene-chlorotrifluoro-ethylene (ECTFE), or combinations thereof. In certain embodiments, the polyolefin film comprises at least one polyimide and in other embodiments, the polyolefin film comprises at least one polyester.

Exemplary polyolefin films made of polyimide include Kapton®, available from DuPont, and Apical®, available from Kaneka Texas Corporation. Exemplary polyolefin films made of polyester include Mylar®, available from DuPont, and 2600 polyethylene terephthalate film, available from American Hoechst. Other commercially available polyolefin films include Tempalux™ (PEI), available from Westlake Plastics Company; Superio-UT™ (PEI), available from Mitsubishi Plastics, Kaladex™; (PEN) and Teonex (PEN), both available from DuPont.

The polyolefin films according to certain embodiments of the present invention may comprise a thickness of from about 0.5, 0.75, 1, 1.25, 1.5, 2.0, 2.5, or 3.0 mils to about 7, 6, 5, 4, 3, and 2.5 mils, including any sub-ranges therein. For example, such ranges may include 1-5 mils, 1-2.5 mils, 2-3 mils, and other ranges in the foregoing amounts.

The adhesive layer, according to certain embodiments of the present invention, may comprise any adhesive that is effective in binding the label to an external surface of the object to which the label may be affixed. In some embodiments, the adhesive exhibits good heat resistance and peel strength. For example, in some embodiments the adhesive may exhibit heat resistance at temperatures of up to 200° C., 225° C., 250° C., 260° C., or 270° C. In some embodiments, the adhesive also may exhibit cohesive strength and high shear resistance. An aggressive pressure sensitive adhesive may be used, such as one of the high-strength or rubber-modified acrylic pressure sensitive adhesives, such as Duro-Tak® 80-115A available from National Starch and Chemical Co. or Aroset™ 1860-Z-45 available from Ashland Specialty Chemical Company. Suitable pressure sensitive adhesives may include, for example, copolymers of alkyl acrylates that have a straight chain of from 4 to 12 carbon atoms and a minor proportion of a highly polar copolymerizable monomer such as acrylic acid. These adhesives are more fully described in U.S. Pat. No. Re. 24,906 and U.S. Pat. No. 2,973,286, the contents of each are hereby incorporated by reference in their entirety. Alternative pressure sensitive adhesives include ultraviolet curable pressure sensitive adhesives, such as Duro-Tak 4000, which is available from National Starch and Chemical Co.

In accordance with certain embodiments of the present invention, labels may comprise a releasable liner as referenced above. The releasable liner may be positioned directly adjacent to the adhesive layer. In this regard, the releasable liner may protect the adhesive layer before the label is applied (or intended to be applied) to an object or facestock, such as during manufacture, printing, shipping, storage, and at other times. Any suitable material for a releasable liner may be used. Typical and commercially available releasable liners, which can be suitable for embodiments of the present invention, can include a silicone-treated release paper or film, such as those available from Loparex, including products such as 1011, 22533 and 11404, CP Films, and Akrosil™.

As also noted above, the topcoat layer may be receptive to printing of indicia there-through (e.g., pass-through printing) or thereon (e.g., printed indicia resides on the surface of the topcoat layer or within the topcoat layer). For instance, some embodiments of the present invention can be suitable for on-demand printing, such as by thermal transfer printing. Moreover, certain embodiments may comprise printed indicia. The printed indicia may convey or provide a variety of information in the form of words, numbers, patterns, designs, barcodes or other forms of human or machine readable graphics. The printed indicia may be applied to the first or outermost surface of the first or outermost layer of the label, such as the surface open to the environment. The first or outermost layer of labels according to certain embodiments of the present invention may comprise the topcoat layer. In this regard, the printed indicia may be applied by any one of a number of different conventional processes, such as flexographic, letterpress, screen, gravure, photographic printing, or other suitable processes. For print-on-demand applications, a thermal transfer process may apply the print, although other methods can be used, such as dot matrix printing or ink jet printing. For pre-print applications, ultraviolet, aqueous or solvent inks may be used if desired. The information (e.g., printed indicia) may be applied before or after assembly of the complete label. Any suitable chemical composition of the ink or other substance employed to print the information may be used. In some embodiments, the ink or substance should be selected to produce a printed pattern that is compatible the topcoat layer, such as one that adheres sufficiently to the topcoat layer to allow for a reasonable degree of permanency.

In another aspect of certain embodiments, the present invention may provide a form comprising a plurality of labels in which at least one of said labels includes a topcoat layer including one or more polyester-melamine compounds (e.g., a polyester-melamine coating). The labels may be releasably attached or adhered to a carrier sheet. In this regard, the form including the labels may be processed through an appropriate printer for imparting the desired indicia onto a plurality of the labels at a single time.

Figure 2:
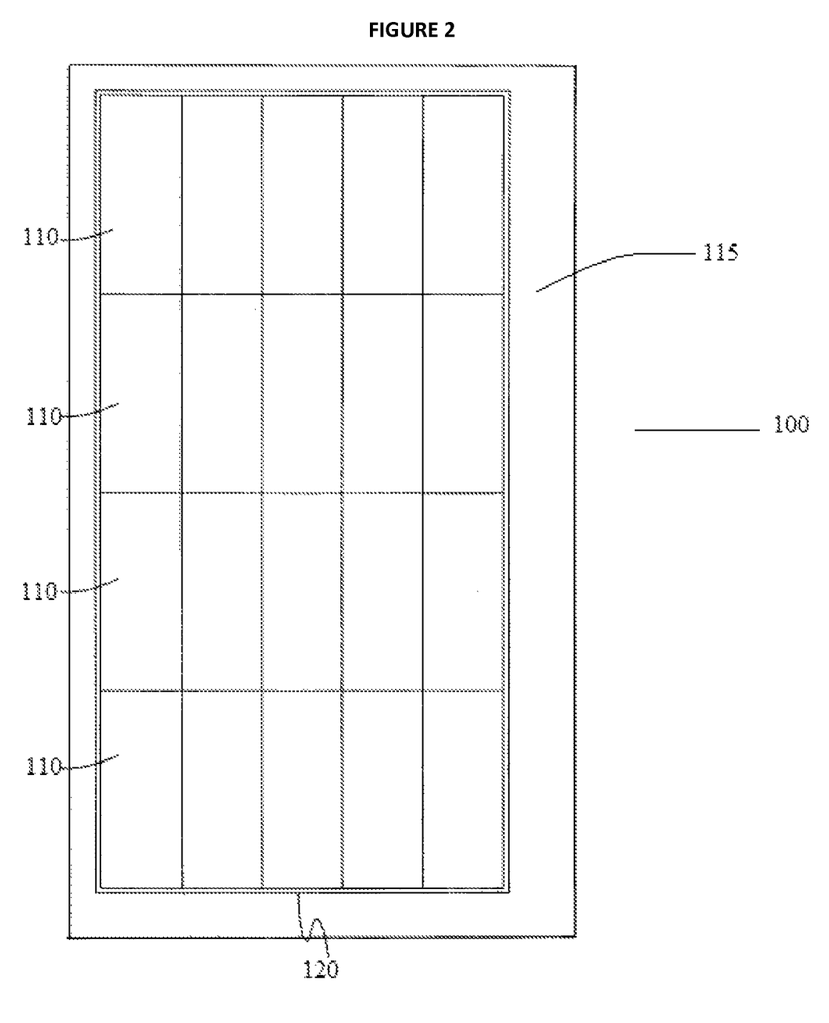
FIG. 2 illustrates a form including a plurality of labels according to certain embodiments of the present invention.

FIG. 2 illustrates a particular form including a plurality of labels according to certain embodiments of the present invention. In particular, FIG. 2 shows an embodiment according to certain embodiments in which form 100 includes a plurality of individual labels 110, according to certain label-embodiments of the present invention, releasably attached or adhered to a carrier sheet 115. In this particular embodiment, the plurality of individual labels 110 are arranged adjacent to each other and form a matrix of labels 120. The form 100 may be processed through a suitable printing or image-producing device to impart printed indicia on the labels 110 at a single time. In this regard, form 100 may be suitable for on-demand printing (e.g., printed at the time or just prior to adhering labels onto a desired object).

In yet another aspect, the present invention includes a continuous roll of labels. The continuous roll of labels can comprise a plurality of labels in which at least one of said labels includes a topcoat layer including one or more polyester-melamine compounds, such as a polyester-melamine coating. The labels may be releasably attached or adhered to a carrier layer, such as a releasable liner, film, or other carrier layer. In this regard, the form including the labels may be processed through an appropriate printer for imparted the desired indicia onto a plurality of the labels at a single time.

Figure 3:
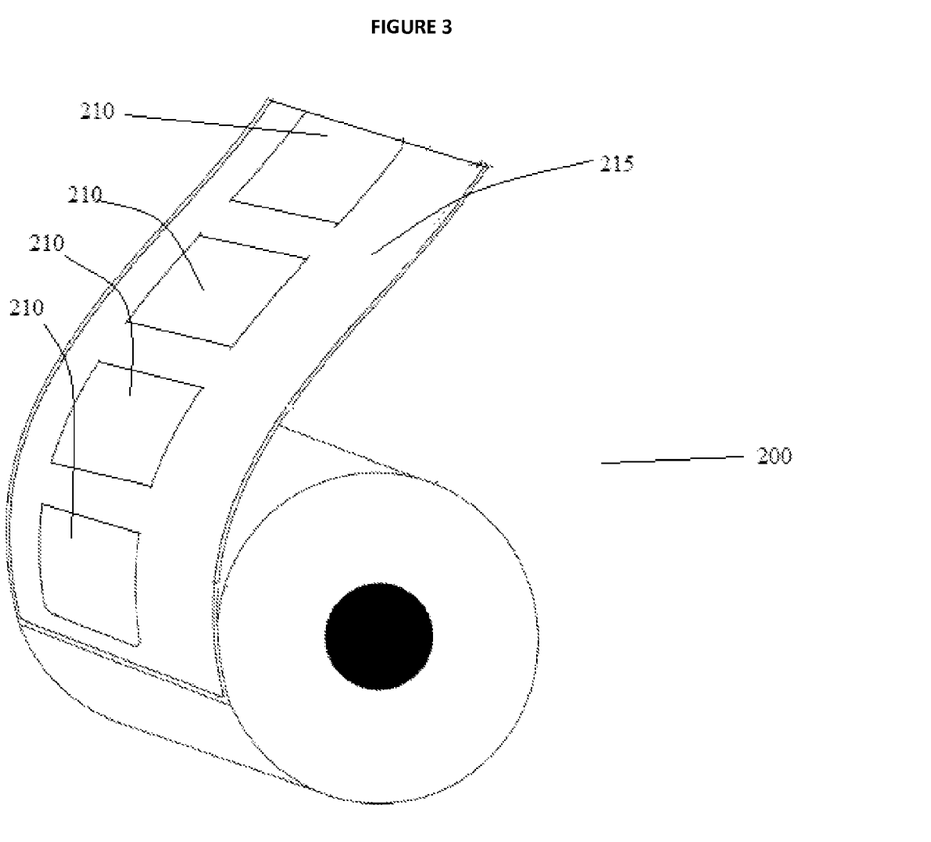
FIG. 3 illustrates a continuous roll of labels according to certain embodiments of the present invention.

FIG. 3 illustrates a particular continuous roll of labels according to certain embodiments of the present invention. In particular, FIG. 3 shows an embodiment according to certain embodiments in which the continuous roll 200 includes a plurality of individual labels 210, according to certain label-embodiments of the present invention, releasably attached or adhered to a carrier film 215. In this particular embodiment, the plurality of individual labels 110 is serially arranged along the length of the carrier film 215. The continuous roll 200 may be processed through a suitable printing or image-producing device to impart printed indicia on the labels 110 serially. That is, a single label (or more) can be printed at a single time. In this regard, the continuous roll 200 may be suitable for on-demand printing (e.g., printed at the time or just prior to adhering labels onto a desired object).

Due at least in part to the high temperature resistance and strong adhesion on polyolefin films, such as polyimide films, the polyester-melamine coating layers according to embodiments of the present invention are particularly well suited for topcoat layers for printed circuit board (PCB) labels and other electronic device labeling applications. The polyester-melamine coating layers (and labels including a topcoat thereof), for instance, may withstand the high temperatures associated with soldering wave of overflow while also exhibiting strong adhesion to polyolefin films, being receptive to printing, and mitigating "yellowing". In addition, in some embodiments, the adhesive may exhibit a resistance to heat at temperatures of up to 200° C., 225° C., 250° C., 260° C., or 270° C. for time durations of at least 20 seconds, 30 seconds, 50 seconds, 60 seconds, 80 seconds, 100 seconds, or 120 seconds. In some embodiments, by way of example, the adhesive may exhibit a resistance to heat at temperatures from about 200° C. to about 270° C. for at least about 20 seconds to about 120 seconds, including each intermittent temperature and time period.

PCB soldering temperature profile, for example, may include temperature exposures between 240° C. to 250° C. (lead free) and 195° C.-200° C. (SnPb alloys). As such, the polyester-melamine coating compositions (and labels coated with the same) are particularly well suited for incorporation on PCB labels and the like, such as electronic component labeling, motor parts labeling, and other applications.

EXAMPLE

The present disclosure is further illustrated by the following example, which in no way should be construed as being limiting. That is, the specific features described in the following example are merely illustrative, and not limiting.

As summarized by Table 1, a polyester-melamine topcoat layer material was formulated by mixing the polyester component and solvents and then dispersing the pigments, crosslinker, catalyst, and additives into the compounding solution.

TABLE 1

| | |
|---|---|
| Hydroxylated polyester | 15 g |
| Mixture of solvents(solvesso 150 [a] DBE [b]: PMA [c] = 40:40:20) | 15 g |
| Diluted solvents (solvesso 100 [d]:PMA: butanol = 40:40:20) | 12 g |

TABLE 1-continued

| | |
|---|---|
| TiO$_2$ | 12 g |
| Cymel 303[e] | 0.6 g |
| CYCAT 4045 [f] | 0.15 g |

[a] mixing solvent from Exxon Mobil Chemical
[b] dibasic acid esters solvent
[c] Propylene Glycol Monomethyl Ether Acetate
[d] mixing solvent from Exxon Mobil Chemical
[e] melamine-based resin (hexamethoxymethylmelamine) from Cytec
[f] acid catalyst from Cytec All label samples comprised a pressure sensitive adhesives layer of 58088 (Avery Dennison) at 27 microns thickness. The samples were placed on a thin aluminum panel for 20 minutes. The panel with the label samples thereon was then placed into a preheated oven at the temperatures reported in Table 2 for 5 minutes. The panels were removed from the oven after 5 minutes, and cooled at and to room temperature.

TABLE 2

Heat resistance results of the topcoating

| Temperature exposure For 5 minutes in ° C. | Testing results |
|---|---|
| 220 | No visible effect |
| 240 | No visible effect |
| 260 | No visible effect |
| 280 | No visible effect |
| 300 | Slight yellowing |
| 320 | Yellowing |

As illustrated in by the results summarized in Table 2, the topcoat layer impressively exhibited desirably good heat resistance to at least 300° C.

These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A label, comprising:
(i) a facestock comprising a polyolefin film; said polyolefin film including a top surface and a bottom surface; and
a topcoat layer having heat resistance to at least 300° C., the topcoat layer comprising a filler and one or more polyester-etherified melamine compounds having polyester crosslinked by etherified melamine; said topcoat layer being positioned at least one of proximate or directly adjacent to at least a portion of the top surface of the polyolefin film.

2. The label according to claim 1, wherein said topcoat layer is directly adjacent said top surface of said polyolefin film.

3. The label according to claim 1, further comprising an adhesive layer positioned at least one of proximate or adjacent to at least a portion of the bottom surface of the polyolefin film.

4. The label according to claim 3, wherein said adhesive layer is directly adjacent said bottom surface of said polyolefin film.

5. The label according to claim 3, further comprising a releasable liner positioned adjacent said adhesive layer such that said adhesive layer is disposed directly or indirectly between said bottom surface of said polyolefin film and said releasable liner.

6. The label according to claim 3, wherein said adhesive layer comprises a pressure sensitive adhesive.

7. The label according to claim 1, wherein said polyolefin film comprises at least one of the following: a polyimide, a polyester, a polyetherimide (PEI), a polyethylene naphthalate (PEN), a polyether sulfone (PES), a polysulfone, polymethylpentene (PMP), a polyvinylidene fluoride (PVDF), a ethylene-chlorotrifluoroethylene (ECTFE), or combinations thereof.

8. The label according to claim 1; wherein the polyolefin film comprises at least one polyimide.

9. The label according to claim 1, wherein the polyolefin film comprises at least one polyester.

10. The label according to claim 1, wherein the etherified melamine comprises an etherified melamine formaldehyde.

11. The label according to claim 1, wherein the etherified melamine contains a plurality of alkoxy groups.

12. The label according to claim 11, wherein each of the plurality of alkoxy groups are the same.

13. The label according to claim 1, wherein the polyester-etherified melamine is formed from a hydroxylated polyester comprising a hydroxyl group-terminated linear or branched polyester.

14. The label according to claim 1, wherein the etherified melamine comprises hexa(methoxymethyl)melamine (HMMM).

15. The label according to claim 1, wherein said one or more polyester-etherified melamine compounds is selected from the following formula:

wherein Q1, Q2, Q3, Q4, Q5, and Q6 are each independently selected from a hydroxylated polyester, a hydrogen atom, an alkyl group, or an aryl group; R1, R2, R3, R4, R5, and R6 are each independently selected from an alkylene group including from 1 to 8 carbon atoms, or an arylene group including from 6 to 10 carbon atoms; wherein at least one of Q1, Q2, Q3, Q4, Q5 or Q6 is a hydroxylated polyester.

16. The label according to claim 15, wherein at least 2 or more of R1, R2, R3, R4, R5, and R6 are the same.

17. The label according to claim 15, wherein R1, R2, R3, R4, R5, and R6 are the same.

18. The label according to claim 15, wherein R1, R2, R3, R4, R5, and R6 are each different alkylene or arylene groups.

19. The label according to claim 15, wherein at least 2 or more of Q1, Q2, Q3, Q4, Q5, and Q6 are the same.

20. The label according to claim 15, wherein Q1, Q2, Q3, Q4, Q5, and Q6 are the same.

21. The label according to claim 15, wherein Q1, Q2, Q3, Q4, Q5, and Q6 are each, a hydrogen atom, an alkyl group, an aryl group or different polyesters.

22. The label according to claim 1, wherein said topcoat layer is receptive to or supports thermal transfer printing.

23. The label according to claim 1, further comprising printed indicia.

24. The label according to claim 23, wherein the printed indica comprises a barcode.

25. The label according to claim 1, wherein the topcoat layer further comprises at least one antioxidant.

26. The label according to claim 1, wherein the topcoat layer further comprises at least one matting agent.

27. The label according to claim 26, wherein the matting agent comprises an average particle size of less than 10 microns.

28. The label according to claim 26, wherein the matting agent comprises an average particle size of less than 5 microns.

29. The label according to claim 1, wherein the topcoat layer comprises a thickness of from about 0.1 to about 4 mils.

30. The label according to claim 1, wherein the topcoat layer comprises a thickness of from about 0.2 to about 2 mils.

31. The label according to claim 1, wherein the topcoat layer comprises a thickness of from about 0.4 to about 1 mil.

32. The label according to claim 1, wherein the polyolefin film comprises a thickness of from about 0.5 to about 5 mils.

33. The label according to claim 1, wherein the polyolefin film comprises a thickness of from about 1 to about 2.5 mils.

34. A form, comprising: (i) a plurality of labels according to claim 1; and a carrier sheet; said plurality of labels are releasably adhered to said carrier sheet.

35. A continuous roll of labels, comprising: (i) a plurality of labels according to claim 1; and (ii) a carrier layer; said plurality of labels are releasably adhered to said carrier layer.

36. An article, comprising: a printed circuit board comprising a label according to claim 1 adhered to at least one surface of the printed circuit board.

* * * * *